Aug. 28, 1951     O. D. UHLE ET AL     2,566,266

PRESSURE EQUALIZING DEVICE

Filed Dec. 20, 1949

OTTO D. UHLE
HERBERT J. DIETZ
GEORGE R. STRUCK
                   INVENTORS

BY
              ATTORNEYS

Patented Aug. 28, 1951

2,566,266

UNITED STATES PATENT OFFICE 2,566,266

PRESSURE EQUALIZING DEVICE

Otto D. Uhle, Herbert J. Dietz, and George R. Struck, Rochester, N. Y., assignors to Eastman Kodak Company, Rochester, N. Y., a corporation of New Jersey Application December 20, 1949, Serial No. 134,032

16 Claims. (Cl. 250—68)

The present invention relates to X-ray cassettes, and more particularly to a pressure equalizing device for use with fluorescent intensifying screens used in connection with X-ray film positioned in the cassette.

In making X-ray exposures, it is common practice to employ one or more intensifying screens, each of which has a fluorescent surface which is positioned in contact with the film in the cassette. In order to secure the best results, it is imperative that the fluorescent surface of the screen contact the film with substantial uniform pressure over the entire exposure area thereof, all of which is well known to those familiar with such cassettes. The necessary pressure or force has been available through the cassette springs. All that remained was for this pressure to be equally distributed over the screen area so as to insure uniform contact of the latter over the full exposure area of the film. In an attempt to secure the desired uniform contact pressure, various types of materials, such as felt, rubber and various other solid yet resilient or yieldable materials have been positioned back of the intensifying screen. It has been found, however, that even with these substances, uneven pressure results, the disadvantages of which are apparent to those in the art.

According to Pascal's law of fluid statics—"pressure on an enclosed fluid is transmitted equally without loss in all directions." Utilizing this principle, the present invention provides a pressure equalizing device in the form of a hermetically sealed volume of air positioned between the back of the fluorescent screen and the wall of the cassette so as to transmit any pressure applied to the air by means of the springs, equally and in all directions to insure a uniform pressure on the screen so as to provide a uniform contact of the latter with the film over the entire exposure area thereof.

The present invention has as its principal object the provision of a fluorescent screen backing member which will apply a uniform pressure over the area of the screen.

Still another object of the invention is the provision of a member of the class described which will apply a uniform pressure on the intensifying screen irrespective of variations in the local pressures applied to the member.

Yet another object of the invention is the provision of a member of the class described which will compensate for variations in cassette dimensions, yet insure uniform pressure over the full area of the screen.

And yet another object of the invention is the provision of a pressure equalizing device which is simple in construction, easy to operate and highly effective in use.

To these and other ends, the invention resides in certain improvements and combinations of parts, all as will be hereinafter more fully described, the novel features being pointed out in the claims at the end of the specification.

In the drawings.

Similar reference numerals throughout the various views indicate the same parts.

The present invention is embodied in the present instance, by way of illustration only, in a pressure equalizing device primarily, although not necessarily, designed for use in a cassette in connection with a fluorescent intensifying screen used with an X-ray film. The device of the present invention is positioned behind the intensifying screen and transmits any pressure applied thereto equally and evenly to the intensifying screen to insure the even and uniform contact of the latter with the sensitized film over the full exposure area thereof, the advantages of which are readily apparent to those in the art.

While the pressure equalizing device of the present invention is intended for use in an X-ray film cassette, the latter forms no part of the present invention, and may be of any suitable or well-known design such, for example, as that disclosed in the patent of Grobe, No. 2,340,378. However, the citing of this patent is not intended as limiting the device of the present invention to the particular cassette construction, but is merely illustrative of one type of cassette suitable for use with the device in the present invention.

Figure 3:
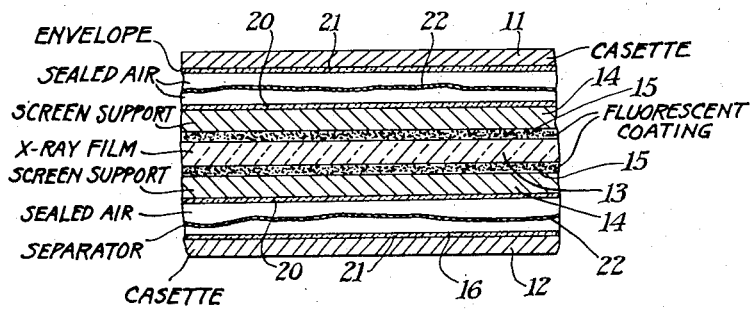
Fig. 3 is a partial sectional view through an X-ray film cassette, showing the relation thereto of the pressure equalizing device of the present invention.

Fig. 3 shows a sectional view through a cassette, and illustrates the relation of the intensifying screen and the pressure equalizing device to the sensitized film. In this embodiment, two intensifying screens and pressure equalizing devices are used. The cassette is formed with opposite walls 11 and 12 between which the film 13 is positioned. The latter is backed on both sides by a pair of fluorescent screens 14, the coatings 15 of which contact the opposite faces of the film 13, as is well known. Each screen 14 is, in turn, backed by a pressure equalizing device of the present invention, broadly designated by the numeral 16. Each device serves to press the associated screen 14 against the film 13 with an even contact pressure so as to insure proper uniform contact of the coating 15 with the adjacent film surface.

The equalizing member or device of the present invention preferably is in the form of a sealed inflated bag, envelope or pillow which operates in accordance with the above-mentioned Pascal law to apply an even and uniform pressure to the screen 14. The construction of the pillow is such that even though unequal or local pressures are applied thereto on the side opposite the screen 14, the pillow will equalize and transmit the applied pressure as a uniform pressure to the screen 14. By means of this arrangement, any inequalities in the cassette or other members, due to manufacturing tolerances, are compensated so as always to retain the screen against the film with a constant and uniform pressure. Thus, the desired photographic results are secured.

The pressure equalizing pillow of the present invention must embody the following characteristics:

1. It must be flexible.
2. It must be transparent to X-rays, or must have a uniform transmission to X-rays.
3. It must be airtight so as to hold air or a fluid over a relatively long period of time.

In order to secure a pillow which would meet these requirements, a large number of materials were given exhaustive tests. The one found most suitable is a product sold by the Dow Chemical Company and known as "Saran" "Grade 517." The exact composition of this material is not known, but it is believed to be a vinylidene polymer and comes in sheet form. It may be clear, dyed, or pigmented, so long as it has a uniform transmission to X-ray. Of course, any other air-impermeable material may be used if it is also transparent to X-ray. Therefore, the use of "Saran" is not intended as a limitation, but merely as the one form of material which has been found best suited for use in X-ray cassettes. Other plastic materials having the necessary X-ray transmission were used, but it was found that they would not hold air over a sufficient length of time to render them suitable for use in X-ray cassettes.

It has been found that this above-mentioned material shrinks so that if used in the form received, the pillow may undergo dimensional changes in use, the disadvantages of which are apparent. To eliminate any possible dimensional changes, the sheet material, prior to being formed into the pillow, is preshrunk by subjecting it to a temperature of about 150 to 160° F. This preshrinking stabilizes the sheet, the advantages of which are obvious.

The preshrunk sheet is then cut roughly to size, the particular dimensions, of course, depending upon the size of the fluorescent screen with which it is to be used. While two separate sheets may be formed, it is preferred to cut a strip equal in length to two sheets, and then to fold the sheet along its middle line to provide a pair of sheets arranged in overlying relation, leaving three unsealed edges. The edges are then sealed in a manner to be later described. It has been found, however, that the sheets forming the pillow, if brought into contact, may tend to stick together, thus isolating a part of the pillow and forming a dead pocket. In order to eliminate any such possibility, a thin sheet or separator is placed on the cut strip before it is folded. This separator is preferably in the form of a porous or air-permeable member, which will allow free passage of the air therethrough, and, in the preferred embodiment, comprises a sheet of thin tissue paper. The pillow thus constitutes two outer layers 20 and 21 of air-impermeable material and an intermediate layer or separator 22 which is air permeable. While the separator sheet 22 may be positioned loosely between the sheets 20 and 21, preferably it is retained in position therein by any suitable means, such as, for example, by small strips 23 of Scotch tape, or similar material.

After the separator sheet has been positioned and the strip folded to position sheets 20 and 21 in overlying relation, the three open edges are then sealed in any suitable manner, such as by electronic sealing which is well known. However, a small unsealed opening is left in one corner of the pillow. In order that the pillow may be effective, it is necessary to insert a fluid, preferably air, into the pillow and this air is inserted through the unsealed corner in any suitable manner. As this feature does not form a part of the present invention, it is not illustrated or described. As the volume of air in the pillow may vary somewhat, it has been found that it must be restricted to definite maximum and minimum limits measured in terms of the average thickness of the air layer under atmospheric pressure. The maximum thickness is .075 inch and is determined by the fact that expansion of the bag along the edges is not free of structural forces and, therefore, at greater thicknesses tends to give a reduced force around the edges of the screens. The minimum thickness is .008 inch and is determined by the fact that less thickness does not provide enough gas volume to compensate for normal variations in cassette structure. A satisfactory volume is one that provides .025 inch in thickness. After the air has been inserted into the pillow, the small opening is then sealed to provide a hermetically sealed envelope, the material of which is air-impermeable, while the separator 22 is air permeable to allow rapid and free passage of the air throughout the area of the pillow so that pressure applied thereto may be equally transmitted to the intensifying screen for the purpose above described. After the pillow has been thus sealed, it is accurately trimmed to size.

Figure 1:
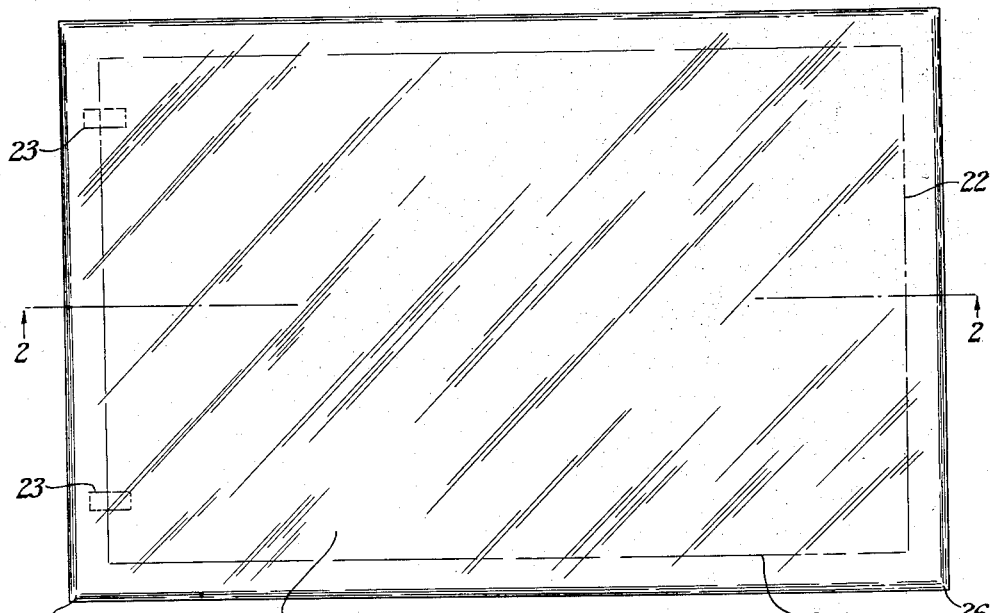
Fig. 1 is a plan view of a pressure equalizing device constructed in accordance with the present invention.
Figure 2:
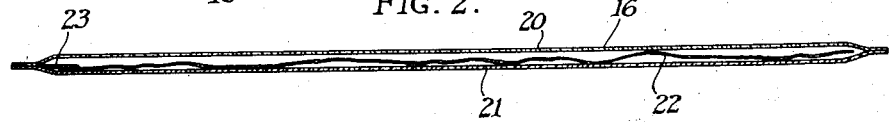
Fig. 2 is a sectional view through the device illustrated in Fig. 1, and taken substantially on line 2—2 thereof, showing the arrangement of the parts.
Figure 4:
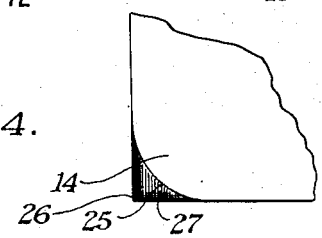
Fig. 4 is a partial plan view of the equalizing means and the associated intensifying screen, showing the reinforced corner sealing of the pressure equalizing device.

It has long been common practice to round off the corners of intensifying screens, as shown at 25, Fig. 4. For manufacturing reasons, however, it is desirable to form the corners of the pillow square, as shown at 26, Figs. 1 and 4. The result is that there is a small area 27 at each corner which projects beyond the rounded corner 25 of the screen, as best shown in Fig. 4. It is apparent that if the pillow is sealed only along a narrow band at the edges of the sheets, there may be a spot between the sealed portion and the corner 25 of the screen which is exposed. Obviously, if this spot were punctured, the air in the pillow would be released and the pillow would then become useless. However, to eliminate this possibility, each corner is given an extra wide seal to seal the entire exposed area 27 between the rounded corner 25 of the screen and the square corner 26 of the pillow, thus sealing the exposed corners, as indicated in Fig. 4. Thus, any possibility of releasing the entrained air by damage to the exposed corner is eliminated.

Thus, the present invention provides a pressure equalizing device in the form of a hermetically sealed pillow in which a definite volume of air is trapped so as to transmit any pressure applied to the pillow in a uniform and even manner to the screen to insure uniform contact of the latter with the sensitized film. The pillow is simple in construction, easy to apply, and highly effective in use. The air pillow may be positioned loosely behind the intensifying screen, or it may be secured thereto in any suitable and well-known manner so as to form therewith a single unit so that it may be handled as a unitary structure. Many methods of securing the pillow to the back of the screen will readily suggest themselves to any mechanic. One such method is to attach the pillow to the screen by use of double-coated adhesive tape applied only at the edges of the pillow. While the pillow has been shown for use in connection with X-ray cassettes to transmit uniform pressures to an intensifying screen, it is obvious that such a pressure equalizing means may be used in any application where it is desirable to transmit an applied pressure evenly in all directions.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

Having thus described our invention, what we claim is:

1. A pressure equalizing device in the form of an inflated envelope comprising, in combination, a pair of overlying sheets of flexible air-impermeable material sealed at their edges to provide an air-tight structure, and a strip of air permeable sheet material positioned loosely in said envelope to maintain said first sheets out of contacting relation intermediate said edges.

2. A pressure equalizing device in the form of an inflated envelope comprising, in combination, a pair of overlying sheets of flexible air-impermeable material sealed at their edges to provide an air-tight structure, and an independent sheet of flexible air permeable material positioned in said envelope to retain said first sheets in spaced relation intermediate said edges.

3. A pressure equalizing device in the form of an inflated envelope comprising, in combination, a pair of overlying sheets of flexible air-impermeable material sealed at their edges to provide an air-tight structure, said envelope containing a definite volume of air, and a strip of thin tissue paper substantially equal to the size of and positioned within said envelope to maintain said first sheets out of contact intermediate said edges.

4. A pressure equalizing device in the form of an inflated envelope comprising, in combination, a pair of overlying sheets of flexible air-impermeable plastic material sealed at all their edges and enclosing a definite volume of gas, and a sheet of thin tissue paper having a size substantially equal to that of said envelope and positioned therein to maintain said first sheets out of contact intermediate said edges.

5. A pressure equalizing device in the form of an inflated envelope comprising, in combination, a pair of overlying sheets of flexible air-impermeable plastic material sealed at all their edges and enclosing a definite volume of gas, a sheet of thin tissue paper having a size substantially equal to that of said envelope and positioned therein to maintain said first sheets out of contact intermediate said edges, and enlarged sealed areas at the corners of said envelope.

6. A pressure equalizing device in the form of an inflated envelope comprising, in combination, a pair of overlying sheets of flexible air-impermeable plastic material sealed at all their edges and enclosing a definite volume of gas, a sheet of thin tissue paper having a size substantially equal to that of said envelope and positioned therein to maintain said first sheets out of contact intermediate said edges, and means to retain the position of said tissue sheet in said envelope.

7. A pressure equalizing device in the form of an inflated envelope comprising, in combination, a pair of overlying sheets of flexible air-impermeable plastic material sealed at all their edges and enclosing a definite volume of gas, a sheet of thin tissue paper having a size substantially equal to that of said envelope and positioned therein to maintain said first sheets out of contact intermediate said edges, and enlarged reinforcing sealed areas at the corners of said envelope.

8. A pressure equalizing device in the form of an inflated envelope adapted for use in connection with a fluorescent screen of an X-ray cassette and comprising, in combination, a pair of overlying sheets of flexible air-impermeable material having a uniform transmission to X-rays, said sheets being sealed at their edges to provide an air-tight structure and enclosing a definite volume of a gas, and a sheet of tissue paper having a size substantially equal to that of said envelope and positioned therein to maintain said first sheets in spaced relation intermediate said edges.

9. A pressure equalizing device in the form of an inflated envelope adapted for use in connection with a fluorescent screen of an X-ray cassette and comprising, in combination, a pair of overlying sheets of flexible air-impermeable plastic material having a uniform transmission to X-rays, said sheets being sealed at their edges to provide an air-tight structure and enclosing a definite volume of a gas, a sheet of tissue paper having a size substantially equal to that of said envelope and positioned therein to maintain said first sheets in spaced relation intermediate said edges, and enlarged sealed areas at the corners of said envelope.

10. A method of forming a pressure equalizing device comprising, in combination, providing a pair of substantially equal size flexible sheets of an air-impermeable material, providing a sheet of flexible permeable material, arranging said first sheets in overlying relation with said second sheet positioned therebetween, sealing said first sheets along their edges, leaving a small unsealed opening, inserting a definite volume of air between said sealed sheets through said opening, and then sealing said opening to entrap said volume between said sealed sheets.

11. A method of forming a pressure equalizing device comprising, in combination, providing a web of an air-impermeable material, preshrinking said web, forming a pair of substantially equal size sheets from said web, providing a thin air-permeable sheet substantially equal in size to said first sheets, arranging said first sheets in overlying relation with said second sheet positioned therebetween, sealing said first sheets along their edges, leaving a small unsealed opening at one corner of said sealed sheets, inserting a definite volume of air between said sealed sheets, and then sealing said opening to retain said volume between said sealed sheets.

12. A method of forming a pressure equalizing device comprising, in combination, providing a web of an air-impermeable material, preshrinking said web, forming a pair of substantially equal size sheets from said web, providing a thin air-permeable sheet substantially equal in size to said first sheets, arranging said first sheets in overlying relation, positioning said second sheet between said first sheets, sealing said first sheets along their edges, leaving a small unsealed opening at one corner of said sealed sheets, inserting a definite volume of air through said opening and between said sealed sheets, and then sealing said opening to retain said volume between said sealed sheets.

13. A method of forming a pressure equalizing device comprising, in combination, providing a web of a flexible air-impermeable material having a uniform transmission to X-rays, severing a portion of said web to provide a pair of substantially equal size sheets, providing a sheet of air-permeable material, positioning said second sheet on one of said first sheets, arranging said first sheets in overlying relation with said second sheet positioned between and retaining said first sheets in spaced relation except along the edges of the latter, edge-sealing said first sheets along substantially the full length of said edges, leaving a small unsealed portion to provide an opening between said first sheets, inserting a definite volume of air between said first sheets through said opening, maintaining said volume between said first sheets, and then sealing said opening.

14. A method of forming a pressure equalizing device comprising, in combination, providing a web of a flexible air-impermeable plastic material having a uniform transmission to X-rays, severing a portion of said web, providing a flexible sheet of an air-permeable material, folding said portion to provide a pair of overlying sheets, positioning said first sheet between said second sheets to space the latter except along their edges, heat-sealing said edges except a small portion at one corner to leave an opening, inserting a definite volume of air through said opening and between said sealed sheets, retaining said volume between said sealed sheets, and finally sealing said opening.

15. A method of forming a pressure equalizing device comprising, in combination, providing a web of a flexible air-impermeable plastic material having a uniform transmission to X-rays, applying heat to said web to preshrink the latter, severing a portion of said web, providing a flexible sheet of an air-permeable material, folding said portion to provide a pair of overlying sheets, positioning said first sheet between said second sheets to space the latter except along their edges, heat-sealing said edges except a small portion at one corner to leave an opening, inserting a definite volume of air through said opening and between said sealed sheets, retaining said volume between said sealed sheets, and finally sealing said opening.

16. A pressure equalizing device in the form of an inflated envelope adapted for use in connection with a fluorescent screen of an X-ray cassette and comprising, in combination, a pair of overlying sheets of flexible air-impermeable plastic material having a uniform transmission to X-rays, said sheets being sealed at their edges to provide an air-tight structure and enclosing a definite volume of a gas which has a thickness between .075 inch and .008 inch, a sheet of tissue paper having a size substantially equal to that of said envelope and positioned therein to maintain said first sheets in spaced relation intermediate said edges, and enlarged sealed areas at the corners of said envelope.

OTTO D. UHLE.
HERBERT J. DIETZ.
GEORGE R. STRUCK.

REFERENCES CITED

The following references are of record in the file of this patent:

UNITED STATES PATENTS

| Number | Name | Date |
|---|---|---|
| 684,701 | Meinecke | Oct. 15, 1901 |
| 1,550,499 | Buck | Aug. 18, 1925 |
| 2,077,453 | Albright | Apr. 20, 1937 |
| 2,371,843 | Powers | Mar. 20, 1945 |